United States Patent
Leibenguth

(10) Patent No.: US 8,245,944 B2
(45) Date of Patent: Aug. 21, 2012

(54) ASSEMBLY CONSISTING OF A MICRO-MODULE AND A REPRODUCING DEVICE WHICH IS EQUIPPED WITH CONTACT-FREE NEAR-COMMUNICATION MEANS

(75) Inventor: Joseph Leibenguth, Saint-Cloud (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/158,052

(22) Filed: Jun. 10, 2011

(65) Prior Publication Data

US 2011/0319134 A1  Dec. 29, 2011

Related U.S. Application Data

(63) Continuation of application No. 10/593,725, filed as application No. PCT/IB2005/000630 on Mar. 7, 2005, now Pat. No. 8,011,590.

(30) Foreign Application Priority Data

Mar. 23, 2004  (EP) .................................... 04290782

(51) Int. Cl.
*G06K 19/06* (2006.01)
(52) U.S. Cl. .... 235/492; 235/441; 340/5.53; 340/932.2; 455/406
(58) Field of Classification Search .................. 235/492, 235/441; 340/5.53, 932.2; 455/406
See application file for complete search history.

(56) References Cited

U.S. PATENT DOCUMENTS

| | | | |
|---|---|---|---|
| 5,635,701 A | 6/1997 | Gloton | |
| 6,307,513 B1 * | 10/2001 | Gaucher et al. | ............... 343/702 |
| 7,583,980 B2 | 9/2009 | Monsacre | |

FOREIGN PATENT DOCUMENTS

| | | |
|---|---|---|
| EP | 0 790 569 | 8/1997 |
| JP | 09/259307 A | 10/1997 |
| JP | 11015928 A | 1/1999 |
| JP | 2001-143025 A | 5/2001 |
| JP | 2003-168089 A | 6/2003 |
| JP | 2004-064328 A | 2/2004 |
| JP | 2004-086402 A | 3/2004 |
| WO | 03027946 A1 | 4/2003 |
| WO | 2004/019261 A2 | 3/2004 |

OTHER PUBLICATIONS

International Search Report for PCT/IB2005/000630 dated Sep. 9, 2005 (4 pages).
Japanese Office Action for Application No. 2007-504494, mailed on Dec. 21, 2010 (14 pages).

* cited by examiner

*Primary Examiner* — Allyson Trail
(74) *Attorney, Agent, or Firm* — Osha Liang LLP

(57) ABSTRACT

Portable communication device for at least mono-directional communication with a terminal, comprising a micro-module including a chip that comprises an antenna allowing the micro-module to communicate with a terminal when the antenna is placed in the immediate vicinity of the terminal, the device being characterized in that it comprises a reader receiving the removable micro-module, said antenna being held by said reader such that the micro-module is removable relative to the antenna.

7 Claims, 2 Drawing Sheets

ASSEMBLY CONSISTING OF A MICRO-MODULE AND A REPRODUCING DEVICE WHICH IS EQUIPPED WITH CONTACT-FREE NEAR-COMMUNICATION MEANS

SUMMARY

The invention relates to micro-modules intended to be inserted in an electronic reader for an authentication of the holder of this micro-module or for reading of a number of rights recorded in such a micro-module.

Such a micro-module is typically a chip card, in the form of a SIM card, a credit card or a prepaid card.

Such a micro-module can also be a key functioning in accordance with the USB communication protocol, exhibiting a form of a rigid finger or any other shape.

Such micro-modules always conform to a number of form constraints. Thus, in the case of chip cards, as the card interacts with the outside world by means of electric contacts and a standardized protocol, the form factor remains fixed in the "ISO" format or in the "PLUG-IN" format.

The card must actually be easy to produce and comply with a very precise dimensioning in order to allow the positioning of the electrical contacts at right-angles with the brushes of the connector of the reader.

The thickness of the card is itself standardized in order to ensure a correct functioning in the reader and in order to keep the general ergonomics of the chip card. This thickness of approximately 0.8 mm is a very strong technical constraint.

By way of illustration, we will cite the case where we have attempted to incorporate in a single plastic card body an indicator and a key in order to offer supplementary features and make of this card a small computer with its peripherals. The difficulty encountered with these solutions is the availability of components such as LCD displays, batteries and display drivers which can be housed in the 0.8 mm of thickness of the card body and which are sufficiently robust to resist production steps and mechanical stresses during the life of the product. The dimensional constraints which apply to the card are particularly limiting in the case of cards equipped with a user interface.

The advent of contactless cards can now provide a first product offer for banking, transport or access control applications; however, the production steps for contactless cards remain long and costly. And, although radiofrequency communication no longer imposes a precise dimension of the card, the shape and size of the antenna impose a card size which remains equivalent to the ISO size. The dimensional constraints thus remain in force also in the case of contactless communication cards.

In order to be differentiated, card issuers can therefore rely only on the appearance of the card (colour, transparency) and not at all on the shape.

One aim of the invention is to offer varied form factors to the holders of electronic micro-modules, and also to allow different features to bearers of these micro-modules despite the dimensional constraints present.

Moreover, holders of current micro-modules cannot consult in a simple and immediate manner the balance of their electronic wallet or the latest operations carried out with their micro-module. For this, they need to use terminals provided by their operator (bank, canteen terminal, etc.) or to purchase portable readers such as a Xiring reader at non-negligible costs.

The invention aims also give a micro-module holder easy access to data related to the micro-module.

BRIEF DESCRIPTION OF THE DRAWINGS

Other characteristics, aims and benefits of the invention will appear upon reading the detailed description which will follow, made with reference to the appended figures, among which.

DETAILED DESCRIPTION

Figure 1:
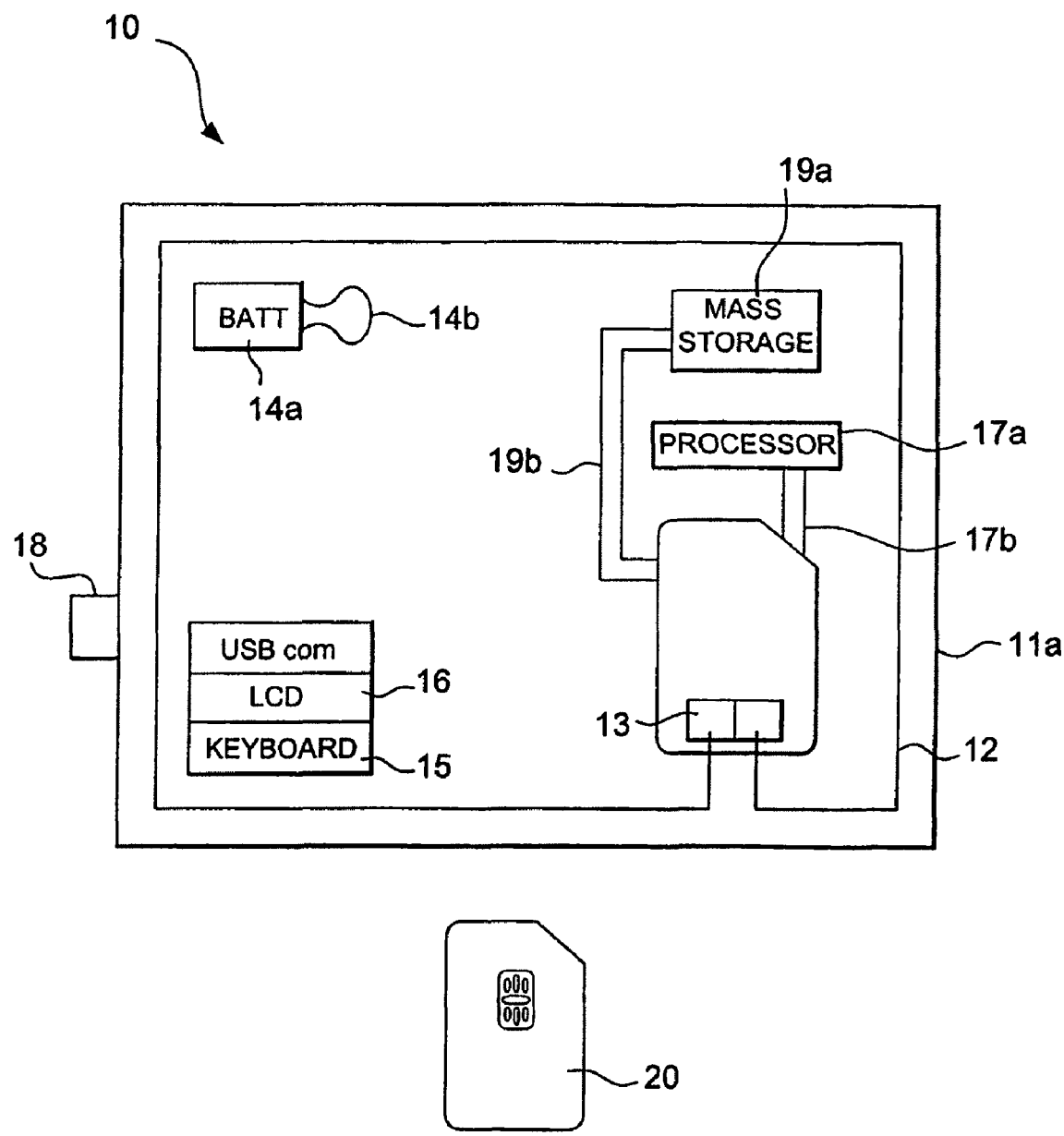
FIG. 1 is a functional diagram of a reader equipped with one micro-module variant of the invention with multiple accessories.

As represented in FIG. 1, a reader 10 in accordance with the invention comprises first a reader body 11 which accommodates a chip card 20.

The reader body 11 comprises outside shells, access hatches to the chip card.

Moreover, it comprises an antenna 12 of rectangular, round or oval form produced as a coil, engraved or made by depositing conducting ink on an insulating medium. The antenna 12 is designed so as to guarantee a good RF coupling between the reader 10 and an external terminal such as a payment or access control terminal.

The antenna 12 and the chip card 20 associated with the former are configured in order to communicate only with an external terminal when the antenna 12 is placed in the immediate vicinity of such a terminal.

Preferably, the antenna 12 and the chip card 20 associated to the former are configured in order to communicate only with an external terminal when the antenna 12 is placed a few centimeters away from the terminal. The user of such a device must therefore initiate an association by close proximity between the reader 10 and a terminal, appreciably in contact with the terminal, although this contact is not necessary, in order that the reader 10 communicates with the terminal.

A communication shall be understood here as a transfer of information which is at least mono-directional, typically from the card 20 to an external terminal. A transfer of information in the inverse direction can however also be implemented in the context of the invention.

The two ends of this antenna 12 are connected to two brushes of a card connector 13.

The connector 13 for chip card provides the link between the contact strips of the micro-module 20 and the antenna 12 present in the reader. This connector can, if need be, also guide the card 20 into position.

The antenna 12 is a short range, contactless communication antenna.

The reader also incorporates a switch, not represented, placed in cut-off on the antenna 12 in order to avoid a transaction unbeknown to the cardholder. The switch also opens a turn of the antenna 12 in order to prevent the establishment of the RF communication. A deliberate action by the holder is necessary to close the circuit and activate the RF communication. The cut-off of the antenna 12 prevents any communication and thus protects the card from any unauthorised communication.

The invention offers the possibility of housing in the reader 10 not only such a switch, but also a battery 14, activation buttons 15 and an LCD-type display 16 without special constraints on the box.

It is possible thanks to this invention that can render the card 20 active instead of passive by placing such a battery 14 in the reader. The battery is advantageous in increasing the range and/or the speed of RF communication for passive components. It can also increase security and switch into active mode as, for example, with the NFC (near field communication) components produced by Philips and Sony.

The battery 14 must have a large energy storage capacity in order to minimise volume and weight while, at the same time, ensuring that the reader is reader compatible with intensive usage without recharging. The battery technologies developed for mobile telephones are suitable for such a reader.

However, the reader functions principally in standby mode, the receiver being only partially active.

Once the reader has activated a communication session with other equipment, this session is checked periodically ("sniffing" technique) in order to confirm the proximity of the equipments. Between two activations, only the RF receiver is partially active.

No electrical contact is required to recharge the battery 14. Advantageously and for security reasons (EMI, Digital Fault Analysis), the recharging of the battery 14 is carried out by magnetic induction. The reader 10, by means of an additional on-board antenna 14a, and which constitutes the secondary of a magnetic transformer, allows recharging of the battery. For this, the reader 10 is simply placed on a support which contains the primary of the transformer.

Other energy transfer techniques can be used, such as the use of light with a converter based on photovoltaic cells or an electro-magnetic (HF) field and an antenna for the conversion.

A charge measuring device is incorporated in the reader to warn that the battery 14 is almost discharged or fully charged. This measurement can be transmitted by radiofrequency link to another equipment having an adequate man-machine interface, such as a personal computer.

However, the reader 10 is here equipped with a LCD 16 (Liquid Crystal Display) or OLED (Organic Light Emitted Diode) which displays, among others, a battery charge meter 14.

The card satisfies the NFC (near field communication) protocol set up by Philips and Sony. Similarly, the RF solution can be replaced by an IR connection.

The card 20 has, in the example in FIG. 1, hardware and software resources in order to manage the display 16 and the buttons 15 or in order to communicate with a computing unit 17 of the reader 10.

The reader 10 thus has a computing unit, and communication between the card 20 and the computing unit 17 is completed by a bus 17a which is here of the MMC (Memory Multimedia Card), SPI or any other bus type compatible with this type of memory.

The display 16 is controlled by the chip of the card 20 through a display driver stored and executed in the chip. Inter alia, the display can show transactions and balance associated to the card 20.

In the case of the addition of such a display of the LCD type 17 and buttons, the reader will have (a) supplementary PCB(s) in order to allow their connection(s) from the chip card connector to the micro-module.

According to the size and the resolution of the display 16, the display of supplementary information, such as the photo of the holder contained in the chip of the micro-module 20, can also be considered.

The keypad 15 allows for a man-machine interface to interrogate the card 20, enter a confidential user code (PIN) and browse various menus.

The reader in FIG. 1 also has a USB connector 18.

The USB connector 18 can connect the card 20 to a computer, for example. This function is particularly useful in the event of using the same card or micro-module for PKI functions in USB protocol contact mode.

An additional bulk memory 19 (up to several tens of megabytes) is placed in the reader 10 and is connected to the chip of the card 20. The content of the bulk memory 19 is encrypted by an algorithm of which the diversified secret key is known only of the card 20. The communication between this bulk memory 19 and the chip of the card 20 is implemented by a bus 19a of the MMC (Memory Multimedia Card), SPI or any other bus type compatible with this type of memory.

This bulk memory 19 is forced to contain private data such as service agreements, digital rights, private data, photographs and other administrative data necessary if the card 20 cannot be connected to a local or international network (e.g. Internet) through the reader 10.

An audible (buzzer) or visual (light-emitting diode) device can also be connected to the chip of the card 20. This device could warn the holder of the reader of the establishment of a communication and of the implementation of a transaction.

An IR (infra-red) communication device can also be placed in the reader 10 in order to be connected to the card 20. This device could allow the exchange of data between the micro-module and other appliances equipped with IR links.

The reader can also incorporate an electronic device allowing the reception of broadcast radio waves.

Optionally, and in order to increase the radio-frequency coupling characteristics, the reader can incorporate a bar or plate of ferrite or magnetic materials.

The reader can be used to offer a supplementary information to the holder (display of balance, movements, etc.). The reader can also make the chip card or micro-module communicate by means of the antenna 12 housed in the reader 10 and connected to the card 20 by a set of contacts, in order to communicate with an external display device, not represented.

The reader 10 and its antenna 12 can also be in communication with the card through a link of the contactless type, using an antenna for communication close to the card, itself relayed by the antenna 12 of the reader 10.

The functions integrated in this example of the invention help optimise the form factor, the miniaturisation (X,Y), the robustness (mechanical and connection reliability), the aesthetics (shape, colour, ergonomics), the RF characteristics (range, communication hole, quality factor, passive and active communication, etc.) and the ease of integration and manufacture (assembly, data inset, cost) of the unit constituted by the reader 10 and the card 20.

The invention enables a miniaturisation and a simplification of the process involved in producing a contactless card by removing the antenna in the reader, all the while conforming with the constraints of minimum antenna size so as to comply with the necessities of RF coupling and range. The invention can produce varied forms and designs for the reader and the card, to improve customer satisfaction.

The chip card can advantageously abandon its ISO dimensions in order to take the form of the PLUG-IN card used in GSM telephones or even be simply created in an electronic module.

The current method of production gives the chip card a leading role in the management of security and as a controller of peripherals, by removing the peripherals into an external reader connected to the card by a standard chip card connector. From this moment onwards, the reader in question can receive a card in ISO format or a small card, whatever its size.

The chip card 20 as illustrated is a preferred format. More generally, the micro-module 20 can have different forms.

Thus, the micro-module can consist of an integrated circuit which is mounted and wired on a printed circuit or a holding body of the metallic and flexible type. The micro-module is thus advantageously protected by transfer moulding or encapsulation in a protective resin.

In the case of an ISO card, the micro-module is first cut up and then inserted onto a plastic card body to the ISO 7816 format specifications.

In the case of a plug-in, a card to ISO dimensions is produced and is then pre-cut or cut in order to form a small card identical to that used in mobile telephones, known under the name of SIM card.

Figure 2:
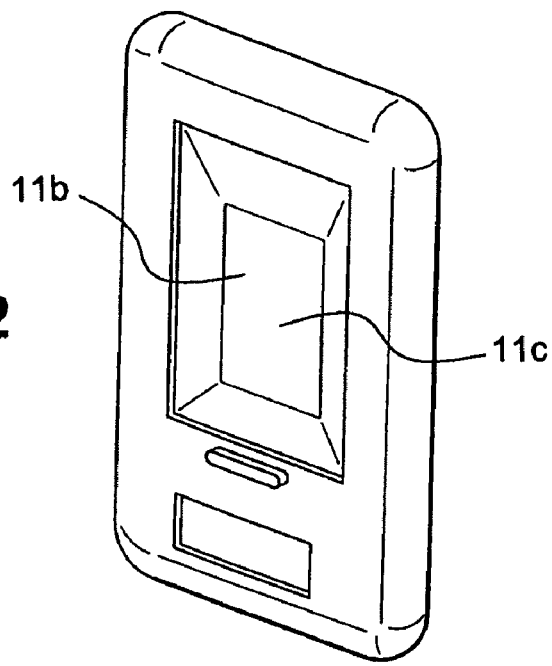
FIG. 2 is an external view of a reader equipped with a micro-module in accordance with a second variant of the invention.

An external view is given in FIG. 2 of a reader conforming to the functional diagram in FIG. 1.

In this example, the box 11 is in the form of a paving slab fitted with a central receptacle 11a for the card, and has a translucent window 11b allowing accommodation of the card 20.

Figure 3A:
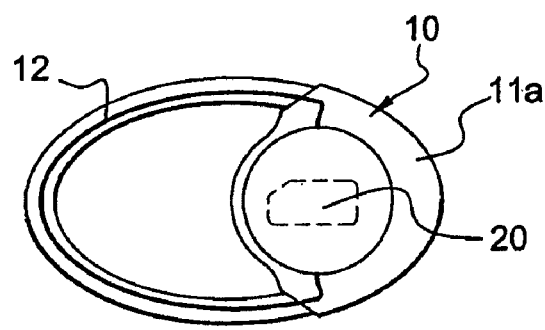
FIGS. 3a, 3b, 3c are external views of a reader equipped with a micro-module in accordance with a third variant of the invention.
Figure 3B:
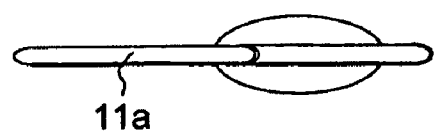
Figure 3C:
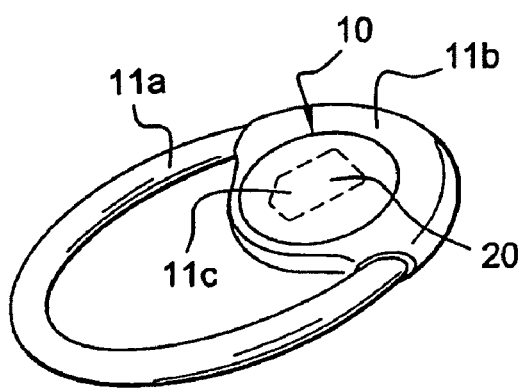

Another example of reader is illustrated in FIGS. 3, 3a and 3b.

In this case for example, the antenna 12 is passive only. The reader 10 can then consist only of an outer shell, a chip card connector of the type with 2, 6 or 8 contacts, and an antenna 12 of the coiled, engraved or silk-screen printed type.

In this example, the box 11 has a ring shape, where the antenna runs. The box holds an enlarged receptacle 11a which accommodates the card 20 and has a translucent window 11b enabling the holder to see card 20.

The micro-module 20 advantageously holds external authentication marking elements. These elements can be indelible laser markings, holograms, signature panels or any other element enabling a falsification to be avoided.

If all communications with the outside world were to be made only through a Radio Frequency interface, the form factor of the card is particularly easy to plan. It will be different from that of conventional contactless cards and can be reduced to a card of the PLUG-IN type or to a simple micro-module.

The invention provides a solution for easily implementing and integrating a chip card, a plug-in card or a micro-module in robust, reliable, flexible, miniature low cost reader, fitted with interesting additional features to enable the card or micro-module to communicate in a way that is natural and transparent for a user.

The capacities for computing, data storage, positioning/proximity checking, formal identification of the holder, of an approval (deliberate proximity between the object and the terminal) of the user, enabling eReader and the related card to be a universal vector for a service operator.

An interaction is implemented between the micro-module and its reader, and with a communication terminal, by a deliberate proximity of both units.

The reader equipped with its micro-module communicates with any communication system, which can then, in turn, easily communicate with the holder of the equipped reader.

The invention can also become useful in the physical or logical access to a company: when the reader and its micro-module enter into the field of action of a contactless terminal, the communication is established and an access system is capable of checking the physical access rights (opening of a door) or logical (access to a server).

The invention also finds use in the physical access to an event: approaching the reader equipped with a contact unit for access to a stadium or any closed area that is monitored by automatic barriers equipped with radio frequency communication modules can instantaneously check the rights of the holder of the reader and the associated micro-module.

According to another possible application, the user can choose an article (beverage, newspaper, etc.) in a vending machine, open the hatch to access the article and take the article without ever having introduced money or a credit card into said machine.

For large amounts, the equipped reader can transmit the photograph of the user in order that the latter can be authenticated by a cashier. An approval (discharge) by a formal identification by means of a biometric detector (e.g.: ATMEL) can act as a PIN code (personal authentication code).

The invention can be used daily when paying for small purchases (electronic wallet function) or for access to offices, to an hotel room or an apartment (access control), or for validation of a public transport journey.

Such an equipped reader can, for example, download and play music, thanks to the bulk storage capacity, the screen, keys and an audio function.

The invention is not limited to microchip cards. Norms and form factors other than those which are applied to contact or contactless microchip cards can be applied to the invention. The invention can be used as a microchip card substitution product and replace it beneficially. Certain techniques used in security microchip cards (e.g.: DPA) could be used beneficially.

Thanks to this invention, the reader becomes the holder's personal peripheral. It can be secured (as a bank terminal) or not according to case.

From simply displaying the balance of an electronic wallet to consulting transactions stored in the card by entering a PIN code, the reader becomes closely related to the card.

This invention releases the card from its direct and ergonomic interface constraints by transposing these functions into the reader which is portable and of low cost.

The invention claimed is:

1. A portable communication device, comprising:
a micro-module, comprising a chip; and
a reader configured to receive the micro-module,
wherein the reader comprises an antenna configured to allow the micro-module to transmit a radio-frequency (RF) communication to a terminal,
wherein the antenna is held by said reader such that the micro-module is removable relative to the antenna, and
wherein the chip is a radio-frequency chip able to transmit radio-frequency communication to a terminal through the antenna.

2. The portable communication device of claim 1, wherein the micro-module comprises a battery to enhance at least one selected from a group consisting of a communication range and a communication speed of the RF communication.

3. The portable communication device of claim 1, wherein the micro-module comprises a connection to connect a mass storage.

4. The portable communication device of claim 1, wherein the micro-module comprises a connection to connect a reader processor.

5. The portable communication device of claim 1, wherein the micro-module comprises a controller to drive peripherals located in the reader.

6. The portable communication device of claim 1, wherein the micro-module comprises a controller and a connection with a reader controller.

7. The micro-module of claim 1, wherein the micro-module comprises a controller to do one selected from a group consisting of drive peripherals and connect a processor in the reader.

* * * * *